United States Patent
Kaines

(10) Patent No.: US 10,255,427 B2
(45) Date of Patent: Apr. 9, 2019

(54) AUTHORIZATION OF UNIQUE COMPUTER DEVICE SPECIMENS

(71) Applicant: Brandon Kaines, Linden, MI (US)

(72) Inventor: Brandon Kaines, Linden, MI (US)

( * ) Notice: Subject to any disclaimer, the term of this patent is extended or adjusted under 35 U.S.C. 154(b) by 312 days.

(21) Appl. No.: 15/071,930

(22) Filed: Mar. 16, 2016

(65) Prior Publication Data

US 2016/0203311 A1    Jul. 14, 2016

Related U.S. Application Data

(60) Provisional application No. 62/133,464, filed on Mar. 16, 2015.

(51) Int. Cl.
*G06F 21/44* (2013.01)
*G06F 21/73* (2013.01)

(52) U.S. Cl.
CPC .............. *G06F 21/44* (2013.01); *G06F 21/73* (2013.01)

(58) Field of Classification Search
CPC .................................. G06F 21/44; G06F 21/73
USPC .......................................................... 726/19
See application file for complete search history.

(56) References Cited

U.S. PATENT DOCUMENTS

| 7,877,788 | B1 | 1/2011 | Topp et al. | |
|---|---|---|---|---|
| 8,984,296 | B1 | 3/2015 | Young | |
| 8,984,580 | B2 | 3/2015 | Bunger et al. | |
| 9,043,896 | B2 | 5/2015 | Doyle et al. | |
| 2009/0203355 | A1* | 8/2009 | Clark | G06F 21/32 455/411 |
| 2010/0062834 | A1 | 3/2010 | Ryan | |
| 2012/0084544 | A1 | 4/2012 | Farina et al. | |
| 2013/0014221 | A1* | 1/2013 | Moore | G06F 21/85 726/3 |
| 2014/0196142 | A1* | 7/2014 | Louboutin | G06F 21/44 726/16 |

* cited by examiner

*Primary Examiner* — Baotran N To
(74) *Attorney, Agent, or Firm* — Wayne State Law School Patent Clinic

(57) ABSTRACT

The authorization of unique computer peripheral specimens to connect to a host computer employs a computer connected device storing both a unique identifier matched by a digital fingerprint authenticating the unique identifier, a device driver on a host computer for communicating with the computer peripheral device, and a policy module that communicates with the host to determine the security policy for the computer peripheral device. The host computer decides whether to allow the computer peripheral device be used by the host, according to the security policy set by the policy module.

11 Claims, 2 Drawing Sheets

AUTHORIZATION OF UNIQUE COMPUTER DEVICE SPECIMENS

The present application claims the benefit of U.S. Provisional Application No. 62/133,464, filed on Mar. 16, 2015, which is incorporated herein by reference in its entirety.

BACKGROUND

Corporate and government computer networks are being compromised in several ways to deliver intelligence and economic advantages to the perpetrators of such attacks. Mechanisms include the installation of malicious softwares that open communication backdoors, trojans and worms, all intended to steal sensitive information or execute tasks not intended by the owners of the targeted equipment.

One class of attacks involves using peripheral devices that are connected to computer terminals or personal computers that might be part of corporate or government networks. Embodiments of such peripherals can be as varied as computer mice, keyboards, or personal flash drives that connect to the host computer via some kind of communication bus such as the Universal Serial Bus (USB). Examples of this class of attack follow in the next three paragraphs.

To siphon sensitive information off of an insulated network, an attacker may create a hidden volume on a USB flash drive to which sensitive information is stored when the USB drive is attached to a host computer. Once the victim attaches the USB drive to a computer outside the insulated computer network, the stored files are surreptitiously uploaded to a server where the attacker can access them.

To combat an organization's personnel from intentionally storing sensitive data on USB enabled peripherals, organizations have disabled common operating system features, such as the auto run feature for USB mounted drives, or even disabled mounting USB enabled storage peripherals. However this presents significant convenience issues to personnel and no longer suffices to thwart newly evolved methods of obtaining the data.

The elementary security counter-measures just mentioned have been eclipsed by more involved schemes that involve the use of a customized USB peripheral. The USB device, outwardly masquerading as a USB storage device, instead identifies itself to the host computer as a keyboard. Once it is allowed to connect, the USB device sends the host a preconfigured set of malicious commands. The host then trusts the keyboard as the origin of the commands and processes the commands inputted to the computer operator. The attack is analogous to allowing an extremely fast-typing hacker to use the keyboard of a computer.

SUMMARY OF THE INVENTION

To authorize a computer peripheral device specimen to connect to a host computer, the following may be leveraged: a computer peripheral device component, a host component and a policy module component. The peripheral device component may store uniquely identifying information that may distinguish between two computer peripheral device specimens, including specimens of identically designed devices. The peripheral device component communicates with the host component via a device driver which receives the uniquely identifying information. The policy module component receives the uniquely identifying information from the device driver via the host component. The policy module decides whether the peripheral device component will be allowed to be used by the host component. The decision, sent to the device driver via the host component, may be based on the uniquely identifying information received in combination with records accessible by the policy module component. The device driver is configured to selectively grant the peripheral device component access to the host component, reflecting the decision generated by the policy module component.

DETAILED DESCRIPTION

Figure 1:
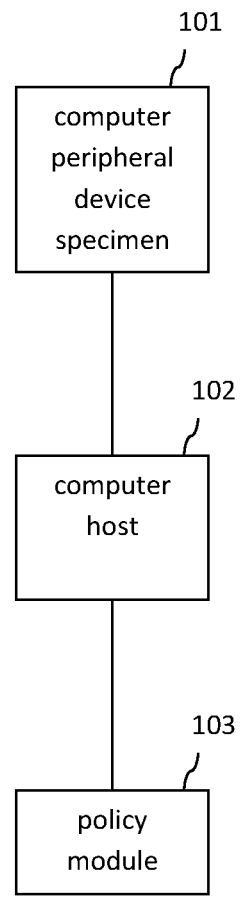
FIG. 1 is a block diagram illustrating an example of a system for authorization of unique computer device specimens.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This patent disclosure relates to the identification and elimination of unrecognized specimens of computer peripheral devices that might gain access to computers and networks whilst either physically connected to a host computer or through their remote access to a network that might be the internet, interactive, television, intranets, extranets, telephones or other digital communication services. Two identically-produced devices, even by the same manufacturer or even according to identical technical specifications, do not constitute the "same" instance or "same" specimen of a device. Regardless of the design of each device, any two device physical instances still represent two separate specimens that can be recognized separately, or even dissimilarly, and that may owned by two different persons. Once individual specimens are uniquely distinguishable, decisions can be made whether to eliminate or allow the use of a particular specimen of a computer peripheral device.

Computer peripheral devices connect to computers or networks in many ways. A very popular connectivity method example uses Universal Serial Bus (USB) connectivity. USB connectivity includes a well-defined and well-practiced mechanical, electrical and software interface of mass appeal in popular consumer electronic products and computers of nearly all types. However, other types of connectivity could include Radio Frequency Identification (RFID), FireWire or even juxtaposition connectivity such as Near Field Communication (NFC) found on modern smart phones.

All these methods of connectivity have the common goal of allowing computer peripheral devices to communicate with a proximate host computer, as opposed to a computer accessible over a network. Such a connection to a proximate computer could modify the behavior of the proximate computer with respect to the proximate computer's other systems or with respect to the proximate computer's behavior over any network with which it might share a connection. It should be noted that once associated with a proximate host computer, the connectivity of a computer peripheral device can be tunneled to an additional computer connected to the proximate host computer or networked to the proximate host computer. This would be a form of projection of the computer peripheral over a remote connection. The present invention may be practiced using any of the non-exhaustive list connectivity or networking technologies just discussed.

In light of the breadth of available connectivity or networking technologies that might carry the effect of connecting a computer peripheral device to a computer, selectively eliminating which specimens or classes of computer peripheral devices can be used by a certain set of computers becomes of utmost importance in a security minded world. The present invention may allow computer or network owners or organizations to control what types of computer peripheral devices can be used by a set of computers, or if more fine-grained control is needed, which specimens of computer connected devices can be used based on a myriad of criteria. For example, using the present disclosure, a company may decide to restrict engineering employees to the use of only a specific list of portable USB flash drive specimens from a plurality of approved manufacturers between the hours of 6 AM through 2 PM on Wednesdays during daylight savings months only while from their own computer workstations, but allow executive employees to connect any USB flash drive on Sundays only when they use the computers on the factory floor. The accounting employees may be restricted from using trackballs, whereas the computer-aided drafting (CAD) designers may be restricted to using the virtual reality headsets produced by the maker of the corporate-approved CAD tool. Fictitious example employee Jay Maverick might be allowed to use a specific company-issued portable USB flash disk drive specimen, as long as he uses it with his own company-issued laptop.

A specimen of a computer connected peripheral interacts with a host to establish itself as an intended tool. Hereafter, the specimen may be referred to as simply a "device." Even today, each device has functionality that is its raison d'être (reason for being) desired by the computer operator. For a computer keyboard, this would be the transmission of input from the keys to the host computer, whereas for a mouse it would be movement of the graphic user interface pointer on the host computer according to the movement of the mouse itself. All these devices offer secondary functionalities that aid in establishing the connection with the host computer, sometimes called "Plug and Play" detection in the case of USB-enabled devices.

The Plug and Play functionality helps describe data fields to the host computer, running a generic (Plug and Play) device driver. The data fields may include the device type of the device (keyboard, speakers, mouse, credit card reader, etc), the manufacturer of the device, the model of the device and sometimes a version number. While the exact list of data fields varies depending on the connectivity technology employed by the device, almost all commercially viable connectivity standards use this strategy. Based on the data fields transmitted by the device, the computer host decides via its generic device driver which specific device driver to use when interacting with the specimen. The use of the correct specific device driver unlocks the primary functionality that interests the computer operator, because each device manufacturer creates devices that have proprietary, rare or non-standard protocols or methodologies. This is why some devices require a special device driver that is released with the device or online concurrently at the time of sale.

The present disclosure can be implemented as a system for authorization of unique computer device specimens, as shown by the example in FIG. 1. The system is comprised of three different types of components: a specimen of a computer peripheral device 101, a computer host 102 and a policy module 103. Each component, discussed separately in this disclosure, can take on different embodiments when practicing the present invention, including the separation or fusion of components. From a system standpoint, each component provides a function leveraged by possible plurality of components. Therefore, generally speaking, the specimen of a computer peripheral device interacts with a computer host, which then interacts with a policy module to determine whether to allow the computer host to use the specimen.

Figure 2:
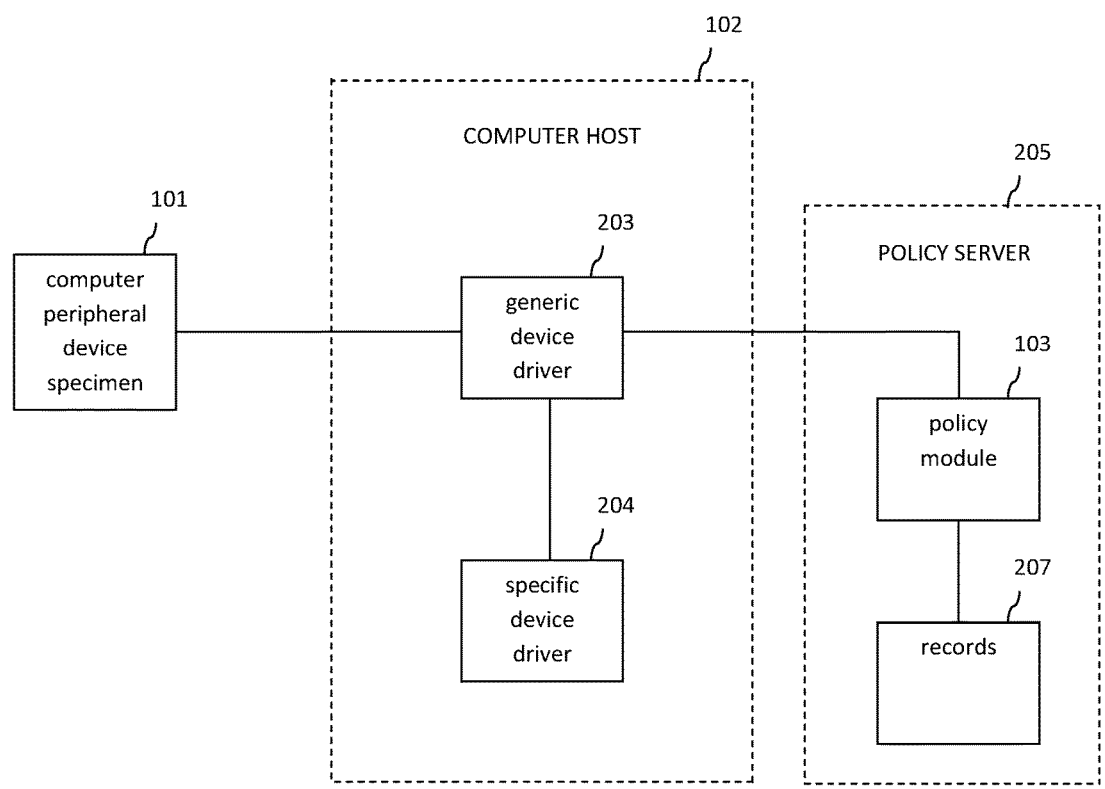
FIG. 2 is a block diagram of an exemplary system for authorization of unique computer device specimens including a policy server and a computer host.

Another example of a system for authorization of unique computer device specimens is shown by the example in FIG. 2. FIG. 2 shows a system where the computer host 102 has a generic device driver 203 for a connectivity technology and a specific device driver 204 compatible with the type of computer peripheral device to which the specimen 101 belongs. Shown as well is a policy server 205 that houses the policy module 103 and records 207.

A specimen of a computer peripheral device 101 can be considered as system component. The specimen 101 stores in an area of non-volatile memory data fields that describe the device. This is common of a device that is not meant to store data as its primary desired functionality, such as a mouse or a keyboard. It is not so clear where the data fields should be stored for a data storage device, such as USB portable flash drive (sometimes called "jump drives"). The temptation is to store the data on the main data storage volume that operating systems, such as recent versions of Microsoft Windows, may display as mounted logical disk drives. However, storing the data on the main volume is dangerous, because the casual user then has access to it and may easily tamper with the data and render the device useless. Therefore an implementation of this invention would likely feature the storage of the data fields in a protected area of non-volatile memory that is not normally accessible or visible to a casual user of the device in its apparently intended mode of use. In some implementations, this protected non-volatile storage is an EEPROM (Electrically Erasable Programmable Read Only Memory) chip on or some special area of flash memory on the device, both of which typically require special tools to access or modify, if at all. The protected non-volatile memory would be the location that would be accessed when the host computer generic driver 203 interrogates the device to find out how to use it.

This invention uses an identifier, often implemented as a serial number field (which is optional in the present-day USB protocol) therefore referred to as such interchangeably, in the protected non-volatile memory, and the storage of an authenticator in an arbitrary-but-known location where the generic device 203 driver will find it over the connectivity technology's protocol. The identifier is usually intended to be unique and not reused with other specimens that the authenticator signer wants to distinguish. The authenticator is a digital certificate that encrypts data and signs the data in such a way that the data may be recognized as originating from a trusted author or source. Specifically in this case, the identifier (or serial number) needs to be authenticated as a true unique identifier, so that a determined person with specialized tools may not just simply modify the device's identifier and go undetected.

It should be noted that in the case of an example of the present invention using present-day USB, adding the identifier and the authenticator to a device will not prevent the device from being used on computers that do not have the other components of the system. This is desirable, because the practice of the present invention does not render the device unusable when secured by the invention.

The method and format of the digital certificate can vary widely depending on the implementation of this invention. In one example, a certificate similar to SSL certificate could be generated that shows serial number and other optional data such as the date of the certificate creation. The certificate would then be signed using a private key from a trusted person or organization. The certificate is then stored as a byte stream in a known and reserved area of protected non-volatile memory that can be queried over the chosen connectivity technology, such as the technology described by the present-day USB standard. According to the present day USB standard, the certificate could conceivably be stored as STRING Descriptor and made available over USB Protocol.

A computer host 102 can be considered as a system component. Hereafter, the computer host 102 may be referred to as simply a "host." The host 102 usually, but not necessarily, executes some type of general purpose operating system such Microsoft Windows or Google Android. The host 102 has a method of physical connectivity with the device 101, for a host 102 that is proximately connected to the device. A remotely or network connected host 102 is distinguished from a proximately connected host 102 in that the proximately connected host 102 does not require the tunneling of the device's signals via a proximately connected host 102. The physical connectivity between a proximately connected host 102 and the device 101 is usually implemented with a mechanical connector that mates with the device 101 in order to operate a form of electro-magnetic or optical signaling capability, such an electric or inductance connection using electrical terminals. Without a mechanical connector, NFC may be employed or just simply a radio transceiver may be used to emit and receive radio wave signals between the device 101 and the host 102.

The computer host hardware is usually monitored by a device driver, sometimes called a generic device driver 203, whether the computer host hardware features a physical connector as previously described or a radio transceiver or even a network connection (non-proximate case). When the presence of the device 101 is detected, the device driver 203 initiates a query of the device 101 to find out how to use the device 101, install the appropriate specific device driver 204 if need be and load the specific device driver 204 for operating system use. The present disclosure may use a generic device driver 203 that performs additional functions that are not performed by generic device drivers 203 used today. The generic device driver 203 may query the device 101 for its identifier and authenticator. Then it will transmit the device information, via the host 102 over a secure connection, to the policy module 103 and await a response from the policy module 103, informing whether the host 102 may be allowed to use the device 101. If the response from the policy module 103 is negative, the generic device driver 203 will break the connection and deny the host 102 any further use of the device 101. In the case of a networked connection, where the device transmissions are tunneled to a non-proximate computer host by a proximate computer host, the same exchange of device 101 information is performed and the generic device driver 203 on the non-proximate computer is configured to handle device connectivity over a networked connection. In the case of a remote computer host, a computer host proximately connected to a computer host 102 that is proximately connected to the device 101, the device transmissions are similarly tunneled.

A policy module 103 can be considered as a system component. The policy module 103 is generally implemented as a policy server 205 in a company setting. This would be a server controlled by Information Technology (IT) personnel. It will receive the generic device driver 203 requests from the host 102 and process them according to the security policy set for the device 101 and the records 207 available to the policy module 103. Multiple alternative embodiments will allow IT personnel to tailor the functionality of the policy module in order to meet their organization's requirements concerning the use of specimens of computer peripherals. The administrators of the policy module 103 would then be able to determine whether to allow the specimen 101 to be used by the requesting host based on a selective combination of criteria. Examples include location, user, time, date, host ID, previous connection history, etc. Once the security policy and the records 207 are compared to the device data transmitted by the host 102, the policy module 103 will return the host access status to the device driver 203 via the host 102. The host access status will tell the device driver 203 whether to deny the device further interaction with the host 102 or whether to allow the host 102 to mount the specific device driver 204 intended by the device manufacturer to unlock the device's primary functionality.

The records 207 consumed by the policy module 103 are usually practiced as data stored on a database server that might or might not reside on the same server 205 as the policy module 103. In some embodiments both the records 207 and the policy module 103 could conceivably reside on the host computer 102. The records 207 can be records generated for the device 101 at the time of initial registration of the device 101 or can be records generated through the previous use of the device 101 with the present invention.

The initial device registration is a process that enters the device 101 as a known device into the records 207, creates the authenticator and places it onto the device. Some examples of the present invention might retain varying numbers of records recorded during past connections requests of the device 101. This might allow the practice of replacing the authenticator with an actualized authenticator on the device 101 and appending the actualized authenticator to the records 207 every time the device 101 connects to the generic device driver 203. By replacing the authenticator every time, optional data in the authenticator, such as the creation date of the authenticator, can be leveraged to compare if the authenticator is old or not (actualized). If the authenticator is detected to be old, it might indicate that the device was compromised.

For example, if a USB flash drive is stolen from employee, copied (including protected non-volatile memory) to a clone device and discreetly returned, the employee may never know that his device has been compromised. However, with the scenario where the authenticator is replaced, the employee's device will have the authenticator replaced in subsequent connections and so will the records used by the policy module. Then if the thief comes back and uses the cloned device on corporate computers after the employee used the USB flash drive again, the device will be denied because the authenticator's date does not match the latest record of the authenticator that is accessible to the policy module. Then the cloned device will be denied. On the other hand, if the cloned device was connected to a corporate computer before the employee's compromised device, then the employee's device will be subsequently denied, thus alerting the employee that the device was potentially compromised. An investigation might ensue, using the records collected to cross-reference the employee's actual use of the device.

An implementation of the policy module may be comprised of several steps that form a connection session: receipt, comparison, decision and transmission steps. In one example, the policy module begins the receipt step by listening, over a published port known to a generic device driver practicing this disclosure, for a connection from a generic device driver located on a host. The host may be recognized by the policy module, based on secure network information, such as Active Directory Lookup. The policy module then could bind a connection with the generic device driver to receive the identifier and the authenticator byte streams in a comma delimited format or some other format that allows extraction of those two separate pieces of data. Then the policy module moves on to the comparison step. The policy module looks up the identifier in database of registered devices. If not found, the policy module will skip to the transmission step and send a denial decision. If the identifier is found in the list of registered devices, the policy module then looks up the rest of the information associated with that particular identifier in a database that stores the date of the entry, the identifier and a copy of the authenticator key (means of decrypting the authenticator). The content of the received authenticator is decrypted and examined by the policy module to make sure that the identifier in the certificate is the same as the identifier that has been looked up in the database pursuant to the receipt step. If the data in the database does not match the data (date of entry, identifier, wrong encryption or lack of a trusted signer, key does not work with the particular authenticator, etc.) in the received authenticator or if the received authenticator cannot be decrypted, the policy module will skip to the transmission step and send a denial decision. Otherwise, the policy module will move on to the decision step. Once it reaches the decision step, the policy module will decide whether to deny or authorize the device based on the security policy the policy module is meant to enforce. In this example, authorized devices are not to be connected to computers belonging to the Active Directory Lookup service on the same network as the policy module outside normal business hours. Therefore the time of the connection is taken into account and if the time of connection is outside the prescribed hours stored in the policy module rules, the policy module will skip to the transmission step and send a denial decision. Same decision step analysis would apply for any other rules that the policy module would be in charge of enforcing per the security policy set by the policy module administrator (typically an Information Technology company officer). If the device connection request satisfies all the policy module security policy rules, the policy module will skip to the transmission step and send an authorization decision. When the policy module reaches the transmission step, it sends the denial or authorization decision back to the generic device driver and terminates the connection, returning to its original listening state at the start of this paragraph.

Of course, the policy module in this example would be fully reentrant to allow multiple simultaneous connections to be serviced at the same time. A person of ordinary skill in the art would recognize that alternative algorithms can be adapted to perform required to perform the authorization function provided by the policy module.

An alternative practice of the present disclosure might include the use of the same distinguishing data (such as identifier or serial number and a matching authenticator) on multiple devices and recording them as one device in the records accessible to the policy module. This solution would be the solution for the IT department personnel that do not want to deal with registering each and every device, but still want to be able to recognize approved devices for which they only want to set one collective security policy. However, the usefulness of the collected records for security audits would be diminished accordingly, since devices with the same distinguishing data would no longer be uniquely distinguishable on a per specimen basis. For the same reason, the security policy would be monolithic for all devices with the same distinguishing data The present invention may be practiced as an apparatus comprised of a device driver. The device driver may be a different generic device driver created for each connectivity technology. The stock generic device driver for the chosen connectivity technology typically delivered with a computer operating system will be replaced, on computers that practice the invention, with a generic device driver that meets the requirements of this invention and it may be signed by a trusted provider. The replacement device driver has at least two interfaces: (a) a first interface to the device; and (b) a second interface to the host computer, which enables the device driver to query the policy module whether to accept or deny the device's connection attempt.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for authorization of a device to connect to a host comprising:
   a device featuring non-volatile memory storing an identifier and an authenticator; a host having a device driver for communicating with the device and creating the authenticator for the device; and a policy module including computer readable instructions, stored on non-transitory memory, the instructions comprising: receiving the identifier and the authenticator from the device driver via the host; comparing the identifier and the authenticator with records accessible by the policy module; determining a host access status of the device; and sending the host access status of the device to the device driver via the host; wherein the device driver is configured to selectively grant the device access to the host based on the host access status of the device, and each time the device is granted access to the host, the device driver places a new authenticator on the device and appends the records to include the new authenticator.

2. The system as claimed in claim 1 wherein the identifier is a uniquely assigned string of characters; and the authenticator is a digitally signed certificate encoding at least the identifier, with the date of creation of the certificate being encoded data that is optionally included in the certificate.

3. The system as claimed in claim 1 wherein the device is a USB device.

4. A device host comprising:
a memory storing a device driver; the device driver in communication with a device to connect to the host, the device having non-volatile memory storing an identifier and an authenticator, the device driver being in further communication with the device and configured to create the authenticator for the device, the device being in further communication with a policy module including computer readable instructions, stored on non-transitory memory, the instructions comprising: receiving the identifier and the authenticator from the device driver via the host; comparing the identifier and the authenticator with records accessible by the policy module; determining a host access status of the device; and sending the host access status of the device to the device driver via the host; wherein the device driver is configured to selectively grant the device access to the host based on the host access status of the device, and each time the device is granted access to the host, the device driver places a new authenticator on the device and appends the records to include the new authenticator.

5. The device host as claimed in claim 4 wherein the policy module is located external to the host; and the records are accessible by the policy module over a remote or network connection.

6. The device host as claimed in claim 4 wherein the policy module is located external to the host; and the records reside on the policy module and are accessible by the policy module.

7. The device host as claimed in claim 4 wherein the device driver and the policy module both reside on the host; and the records are accessible by the policy module over a remote or network connection.

8. The device host as claimed in claim 4 wherein the device driver and the policy module both reside on the host; and the records reside on the host and are accessible by the policy module.

9. The device host as claimed in claim 4 wherein the device is a USB device such that the device driver is configured to connect to the USB device.

10. A method for authorizing a device to connect to a host comprising:
providing a device featuring non-volatile memory storing an identifier and an authenticator;
providing a host having a device driver for communicating with the device and creating the authenticator for the device; providing a policy module including computer readable instructions, stored on non-transitory memory; receiving the identifier and the authenticator from the device driver via the host; comparing the identifier and the authenticator with records accessible by the policy module; determining a host access status of the device; and sending the host access status of the device to the device driver via the host; wherein the device driver selectively grants the device access to the host based on the host access status of the device, and each time the device is granted access to the host, the device driver places a new authenticator on the device and appends the records to include the new authenticator.

11. The method according to claim 10, wherein after the device stores the identifier and the authenticator, the device can be accessed by a system including the host or one or more additional systems without the host.

* * * * *